United States Patent
Sueoka et al.

(10) Patent No.: US 8,240,048 B2
(45) Date of Patent: Aug. 14, 2012

(54) METHOD FOR MANUFACTURING AN ADSORPTION HEAT EXCHANGER

(75) Inventors: Takahisa Sueoka, Osaka (JP); Hirohiko Matsushita, Osaka (JP); Akira Kamino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1264 days.

(21) Appl. No.: 11/922,928

(22) PCT Filed: Jun. 23, 2006

(86) PCT No.: PCT/JP2006/312620
§ 371 (c)(1),
(2), (4) Date: Dec. 27, 2007

(87) PCT Pub. No.: WO2007/000948
PCT Pub. Date: Jan. 4, 2007

(65) Prior Publication Data
US 2009/0126397 A1    May 21, 2009

(30) Foreign Application Priority Data

Jun. 28, 2005  (JP) ................................. 2005-188877

(51) Int. Cl.
B21D 53/02 (2006.01)
(52) U.S. Cl. ................................................... 29/890.03
(58) Field of Classification Search .............. 29/890.03
See application file for complete search history.

(56) References Cited

U.S. PATENT DOCUMENTS

| | | | | |
|---|---|---|---|---|
| 5,388,637 A | * | 2/1995 | Jones et al. | 165/104.12 |
| 5,916,635 A | | 6/1999 | Ishii et al. | |
| 2004/0202793 A1 | * | 10/2004 | Harper et al. | 427/430.1 |

FOREIGN PATENT DOCUMENTS

| | | |
|---|---|---|
| EP | 1 493 984 A1 | 1/2005 |
| JP | 6-206047 A | 7/1994 |
| JP | 7-265649 A | 10/1995 |
| JP | 2001-54737 A | 2/2001 |
| JP | 2002-263436 A | 9/2002 |
| JP | 2003-251133 A | 9/2003 |
| JP | 2004-071186 A | 3/2004 |
| JP | 2004-294048 A | 10/2004 |

* cited by examiner

*Primary Examiner* — David Bryant
*Assistant Examiner* — Moshe Wilensky
(74) *Attorney, Agent, or Firm* — Birch, Stewart, Kolasch & Birch, LLP.

(57) ABSTRACT

An apparatus (20) for manufacturing an adsorption heat exchanger includes a storage tank (35) for storing a source liquid prepared by dispersion of an adsorbent in a liquid binder, a support member (30) for supporting a heat exchanger main body (40), and a shaft member (21). The heat exchanger main body (40) is rotated around the shaft member (21) extending along the direction in which a plurality of fins (57) are arrayed. When the heat exchanger main body (40) is rotated in the source liquid, the source liquid is distributed throughout the entire area of the void between each adjacent pair of the fins (57) whereby the source liquid is adhered to the entire surface area of each of the fins (57). On the other hand, when the heat exchanger main body (40) is rotated in the air, excess source liquid remaining in the void between each adjacent pair of the fins (57) is scattered away therefrom, and a layer of the source liquid is formed throughout the entire surface area of each of the fins (57).

9 Claims, 6 Drawing Sheets

METHOD FOR MANUFACTURING AN ADSORPTION HEAT EXCHANGER

TECHNICAL FIELD

The present invention relates to an adsorption heat exchanger in which an adsorbent-containing adsorption layer is formed on the surface of a heat exchanger main body. This invention also relates to a method and an apparatus for manufacture of such an adsorption heat exchanger.

BACKGROUND ART

Humidity control systems, configured to provide indoor humidity control by adsorption-desorption of moisture present in the air, have been known in the art for many years.

For example, Japanese patent document No. JP-A-2004-294048 discloses a humidity control system including a refrigerant circuit to which an adsorption heat exchanger is connected. Also connected to the refrigerant circuit of the humidity control system are a compressor, a first adsorption heat exchanger, an expansion valve, a second adsorption heat exchanger, and a four-way valve. The refrigerant is circulated through the refrigerant circuit whereby the refrigeration cycle is performed. As a result, one of the two adsorption heat exchangers functions as an evaporator while the other of the two adsorption heat exchangers functions as a condenser.

More specifically, when the humidity control system is operating in the humidification mode, outdoor air is passed through an adsorption heat exchanger serving as a condenser. In the adsorption heat exchanger (condenser), its adsorbent is heated by refrigerant, and moisture is desorbed from the adsorbent. The desorbed moisture is discharged to the outdoor air. The air thus humidified is supplied to the room whereby indoor humidification is provided. Meanwhile, indoor air is passed through an adsorption heat exchanger serving as an evaporator. In the adsorption heat exchanger (evaporator), its adsorbent is cooled by refrigerant and at the same time that moisture present in the air is adsorbed on the adsorbent, the resulting heat of adsorption is removed to the refrigerant. The air whose moisture content has been thus imparted to the adsorbent is discharged to outside the room.

On the other hand, when the humidity control system is operating in the dehumidification mode, outdoor air is passed through an adsorption heat exchanger serving as an evaporator. In the adsorption heat exchanger (evaporator), its adsorbent is cooled by refrigerant and at the same time that moisture present in the air is adsorbed on the adsorbent, the resulting heat of adsorption is removed to the refrigerant. The air thus dehumidified is supplied to the room whereby indoor dehumidification is provided. Meanwhile, indoor air is passed through an adsorption heat exchanger serving as a condenser. In the adsorption heat exchanger (condenser), its adsorbent is heated by refrigerant and moisture is desorbed from the adsorbent. The desorbed moisture is discharged to the air. The air which has been thus used to regenerate the adsorbent is discharged to outside the room.

In the humidity control system, the circulation direction of the refrigerant in the refrigerant circuit is switched by the four-way valve simultaneously with switching the flow path of air by means of a damper whereby the operation of regeneration and the operation of adsorption are alternately repeatedly performed in the two adsorption heat exchangers. That is to say, the humidity control system provides continuous supply of humidity-controlled air to the room without impairing both the capability of adsorption and the capability of being regenerated of the adsorbents.

These adsorption heat exchangers used for air humidity control are each made up of a heat exchanger main body and an adsorbent laminated film (adsorption layer) formed on the heat exchanger main body. The heat exchanger main body is implemented by a fin and tube heat exchanger which is made up of a large number of fins of aluminum which are formed in rectangular shapes and arranged in parallel with each other, and a heat transfer tube of copper which is passed through each of the fins. Also note that zeolite, silica gel, activated carbon, or any other suitable substance in powder form may be used as an adsorbent for the adsorption heat exchangers.

DISCLOSURE OF THE INVENTION

Problems that the Invention Seeks to Overcome

There is one method of forming an adsorption layer on the surface of a heat exchanger main body in the way as described above, in which method the heat exchanger main body is dipped into a source liquid in the form of slurry containing an adsorbent and a binder so that the source liquid is adhered to the surface of the heat exchanger main body, and the source liquid adhered in the form of a film to the surface of the heat exchanger main body is dried and becomes solidified. However, in order to advantageously gain the surface area of the heat exchanger main body, the pitch of each fin is set relatively narrow (for example, from 1.4 to 1.6 mm) in many cases. In such a setting, the void defined between each adjacent pair of the fins will be blocked (clogged) by the adsorbent and binder. Especially, if trying to form an adsorption layer of relatively thick thickness (for example, from 0.2 to 0.3 mm) with a view to increasing the amount of adsorption, the problem of clogging of the voids becomes more serious. Accordingly, air is no longer allowed to pass through the void between each adjacent pair of the fins due to such clogging, and the adsorption heat exchanger may have an increased vent resistance and suffer poor adsorption-desorption performance.

With the above problems in mind, the present invention was made. Accordingly, it is an object of the present invention to provide a method of manufacturing an adsorption heat exchanger by which method an adsorption layer is formed, uniformly and without clogging, throughout the entire surface area of each fin, a manufacturing apparatus capable of performing the method, and an adsorption heat exchanger of high performance manufactured in accordance with the method.

Means for Solving the Problems

The present invention provides, as a first aspect, a method of manufacturing an adsorption heat exchanger by dipping a heat exchanger main body (40), the heat exchanger main body (40) being provided with a plurality of plate-like fins (57) arrayed in the extension direction of a heat transfer tube (58), into a slurry source liquid prepared by dispersion of an adsorbent in a liquid binder, to thereby form an adsorption layer on the surface of the heat exchanger main body (40). The method of the first aspect is characterized in that it comprises: a dipping step in which the heat exchanger main body (40) is dipped into the source liquid; a scattering step in which the heat exchanger main body (40) after having undergone the dipping step is rotated in the air around a rotary shaft extending along the direction in which the plurality of fins (57) are arrayed; and a drying step in which the heat exchanger main body (40) after having undergone the scattering step is dried.

In the first aspect of the present invention, during manufacture of the adsorption heat exchanger, the dipping step is conducted in which the heat exchanger main body (40) which is of a so-called fin and tube type is dipped into the adsorbent/binder-containing source liquid. In the dipping step, the source liquid enters the void between each adjacent pair of the fins (57), and the source liquid is adhered onto the surface of each fin (57). However, if the pitch of the fins (57) is set relatively narrow, the void between each adjacent pair of the fins (57) will be clogged with the source liquid in the dipping step.

In order to cope with the above, the scattering step follows the dipping step in the present invention. In the scattering step, the heat exchanger main body (40) is rotated in the air around the rotary shaft extending along the arrangement direction of the fins (57) of the heat exchanger main body (40), as a result of which the source liquid clogging the void between each adjacent pair of the fins (57) and excess source liquid adhering to the surface of each fin (57) are scattered away therefrom by centrifugal force. Consequently, even when the space between each adjacent pair of the fins (57) in the heat exchanger main body (40) is somewhat narrow, excess source liquid filling up the void between each adjacent pair of the fins (57) is removed without fail upon receipt of centrifugal force.

The drying step follows the scattering step. In the drying step, the adhered source liquid to the surface of the heat exchanger main body (40) is dried and becomes solidified. As a result, an adsorbent-containing adsorption layer is formed on the surface of the heat exchanger main body (40). Since clogging due to the source liquid was eliminated in the surface of each fin (57) by the scattering step, the adsorption layer is relatively uniformly formed on the surface of the heat exchanger main body (40).

The present invention provides, as a second aspect according to the first aspect, a method of manufacturing an adsorption heat exchanger. The method of the second aspect is characterized in that in the dipping step the heat exchanger main body (40) is rotated in the source liquid around the rotary shaft at a lower speed than in the scattering step.

In the dipping step of the second aspect, the heat exchanger main body (40) is dipped into the source liquid while being rotated around the rotary shaft at a low speed. At this time, the heat exchanger main body (40) is rotated in the direction that allows passage of the source liquid through the void between each adjacent pair of the fins (57), as a result of which the source liquid is delivered throughout the entire area of the void between each adjacent pair of the fins (57) and the source liquid is adhered to the entire surface area of each of the fins (57).

The present invention provides, as a third aspect according to either the first aspect or the second aspect, a method of manufacturing an adsorption heat exchanger. The method of the third aspect is characterized in that the plurality of fins (57) are formed in a rectangular plate shape, and that in the scattering step the heat exchanger main body (40) is rotated in such a position that one of the long sides of each of the plurality of fins (57) faces towards the rotary shaft.

In the third aspect of the present invention, the fins (57) formed in an elongated, rectangular plate shape are arrayed in the extension direction of the heat transfer tube (58). In the scattering step, one of the long sides of each fin (57) constantly faces towards the rotary shaft and the heat exchanger main body (40) is rotated. When the heat exchanger main body (40) is rotated in such a position, source liquid clogging the void between each adjacent pair of the fins (57) and excess source liquid adhering to the surface of the fins (57) will be scattered away therefrom in the width direction of the fins (57) by centrifugal force. In other words, if the heat exchanger main body (40) is rotated in the aforesaid position, this facilitates scattering of the source liquid from the fins (57), thereby ensuring that the excess source liquid is removed from the void between each adjacent pair of the fins (57).

The present invention provides, as a fourth aspect according to either the first aspect or the second aspect, a method of manufacturing an adsorption heat exchanger. The method of the fourth aspect is characterized in that the dipping step, the scattering step, the drying step, and a wetting step in which the heat exchanger main body (40) after having undergone the drying step is dipped into water are sequentially repeatedly conducted.

In the fourth aspect of the present invention, after the adsorbent-containing adsorption layer was formed on the surface of the heat exchanger main body (40) in the drying step, the wetting step of dipping the heat exchanger main body (40) into water is conducted. In the wetting step, the adsorption layer on the surface of the heat exchanger main body (40) is placed in the aqueous state.

In addition, after completion of the wetting step, the dipping step is conducted again. In the dipping step, the heat exchanger main body (40) which is dipped into the source liquid is in such a state that the adsorption layer on the surface thereof is containing moisture. Here, if the adsorption layer of the heat exchanger main body (40) which is dipped into the source liquid is in the dry state, this facilitates absorption of moisture (which is present in the adhered source liquid to the adsorption layer) into the adsorption layer. This results in an increase in the degree of viscosity of the adhered source liquid to the surface of the adsorption layer. Accordingly, it becomes difficult to eliminate clogging of the voids with the source liquid by scattering of the source liquid remaining in the void between each adjacent pair of the fins (57) in the subsequent scattering step.

On the other hand, in the present invention, in the second and later dipping steps, the adsorption layer is previously placed in the aqueous state. Therefore, it becomes difficult for moisture present in the source liquid to be absorbed into the surface of the adsorption layer whereby the degree of viscosity of the source liquid can be held below a predetermined value. As a result, even in the subsequent scattering step, the source liquid in the void between each adjacent pair of the fins (57) is removed without fail whereby clogging of the voids with the source liquid is eliminated.

The present invention provides, as a fifth aspect according to either the first aspect or the second aspect, a method of manufacturing an adsorption heat exchanger. The method of the fifth aspect is characterized in that the binder is an organic water-based emulsion, and that the percentage by weight of the solid content of the binder with respect to the adsorbent in the source liquid is not less than 10 percent nor more than 20 percent.

In the fifth aspect of the present invention, the organic water-based emulsion is used as a liquid binder which is combined to the source liquid. In addition, the ratio of combination of the adsorbent and the binder is adjusted such that the percentage by weight of the binder with respect to the adsorbent is not less than 10 percent nor more than 20 percent in the source liquid.

The present invention provides, as a sixth aspect according to either the first aspect or the second aspect, a method of manufacturing an adsorption heat exchanger. The method of the sixth aspect is characterized in that the degree of viscosity of the source liquid is not less than 150 mPa·s nor more than 300 mPa·s when measured by means of a B-type rotational viscometer under such conditions that the liquid temperature is 25 degrees Centigrade, and the rotational speed is 60 min$^{-1}$.

In the sixth aspect of the present invention, the source liquid is moisture-adjusted so that the degree of viscosity thereof measured by a B-type rotational viscometer (temperature: 25 degrees Centigrade; rotational speed: 60 min$^{-1}$ (rpm)) is not less than 150 mPa·s nor more than 300 mPa·s.

The present invention provides, as a seventh aspect, an adsorption heat exchanger comprising a heat exchanger main body (40) provided with a plurality of plate-like fins (57) arrayed in the extension direction of a heat transfer tube (58) and an adsorption layer containing an adsorbent and formed on the surface of the heat exchanger main body (40). And, the adsorption heat exchanger of the seventh aspect is characterized in that the surface of the adsorption layer forms irregular concave-convex patterns.

In the seventh aspect of the present invention, irregular concave-convex patterns which are observable (even visually) are formed on the surface of the adsorption layer of the adsorption heat exchanger. Such a concave-convex pattern is similar to a so-called "stipple pattern", "ripple pattern" or "citrus yuzu skin pattern" used in the industry of paints/paint application wherein delicate concave-convex portions form irregular patterns in the form of waves or fibers.

The present invention provides, as an eighth aspect according to the seventh aspect, an adsorption heat exchanger which is characterized in that the average thickness of the adsorption layer is not less than 0.2 mm nor more than 0.3 mm.

In the eighth aspect of the present invention, the adsorption layer is formed on the surface of the heat exchanger main body (40) such that the average thickness of the adsorption layer is not less than 0.2 mm nor more than 0.3 mm.

The present invention provides, as a ninth aspect according to the sixth aspect, an adsorption heat exchanger which is characterized in that the pitch of each of the plurality of fins (57) is not less than 1.4 mm nor more than 1.6 mm.

In the ninth aspect of the present invention, the adsorption layer is formed on the surface of the heat exchanger main body (40) in which the space between each adjacent pair of the plurality of fins (57) is not less than 1.4 mm nor more than 1.6 mm.

The present invention provides, as a tenth aspect, an apparatus for manufacturing an adsorption heat exchanger by forming an adsorption layer on the surface of a heat exchanger main body (40) provided with a plurality of plate-like fins (57) arrayed in the extension direction of a heat transfer tube (58). The manufacturing apparatus of the tenth aspect includes a storage tank (35) for storing a slurry source liquid prepared by dispersion of an adsorbent in a liquid binder, and a rotation mechanism (15) for rotating the heat exchanger main body (40) around a rotary shaft extending along the direction in which the plurality of fins (57) are arrayed wherein the manufacturing apparatus is configured to be switchable between a first state in which the heat exchanger main body (40) is rotated in the source liquid and a second state in which the heat exchanger main body (40) is pulled out from the source liquid and rotated in the air.

In the tenth aspect of the present invention, the manufacturing apparatus for forming an adsorption layer on the surface of the heat exchanger main body (40) is provided with the storage tank (35) and the rotation mechanism (15). The storage tank (35) holds a source liquid containing a binder and an adsorbent. The rotation mechanism (15) rotates the heat exchanger main body (40) around the rotary shaft along the direction in which the plurality of fins (57) are arrayed.

When the manufacturing apparatus enters the first state, the heat exchanger main body (40) which is driven by the rotation mechanism (15) is rotated in the source liquid held in the storage tank (35). As a result, the source liquid is distributed to the void between each adjacent pair of the fins (57) of the heat exchanger main body (40) whereby the source liquid is adhered to the entire surface area of each of the fins (57). In other words, when the heat exchanger main body (40) is rotated with the manufacturing apparatus placed in the first state, the dipping step of the second aspect is conducted.

On the other hand, when the manufacturing apparatus enters the second state, the heat exchanger main body (40) which is driven by the rotation mechanism (15) is rotated in the air. As a result, the source liquid clogging the void between each adjacent pair of the fins (57) of the heat exchanger main body (40) is scattered away therefrom by centrifugal force. In other words, when the heat exchanger main body (40) is rotated with the manufacturing apparatus placed in the second state, the scattering step of the first aspect is conducted.

The present invention provides, as an eleventh aspect according to the tenth aspect, a manufacturing apparatus which is characterized in that the rotation mechanism (15) includes a shaft member (21) as a horizontally-extending rotary shaft, and a support member (30) which supports the heat exchanger main body (40) in such a position that the direction in which the plurality of fins (57) are arrayed and the shaft member (21) are in parallel with each other, and which rotates around the shaft member (21) together with the heat exchanger main body (40).

The rotation mechanism (15) of the eleventh aspect is provided with the shaft member (21) extending in the horizontal direction and the support member (30) for supporting the heat exchanger main body (40). The support member (30), while holding the heat exchanger main body (40) so that the direction in which the fins (57) are arrayed and the shaft member (21) are in parallel with each other, is rotated together with the shaft member (21). As a result, in the first state of the manufacturing apparatus, the heat exchanger main body (40) supported by the support member (30) is rotated in the source liquid whereby the dipping step is conducted. On the other hand, in the second state of the manufacturing apparatus, the heat exchanger main body (40) supported by the support member (30) is rotated in the air whereby the scattering step is conducted.

The present invention provides, as a twelfth aspect according to the eleventh aspect, a manufacturing apparatus which is characterized in that the support member (30) supports a pair of heat exchanger main bodies (41, 42) such that the pair of heat exchanger main bodies (41, 42) are axisymmetric with respect to the axial center of the shaft member (21).

In the twelfth aspect of the present invention, the two heat exchanger main bodies (41, 42) are supported by the support member (30). The heat exchanger main bodies (41, 42) are arranged such that they face each other across the shaft member (21). In the first state of the manufacturing apparatus, when the support member (30) is rotated together with the shaft member (21), the heat exchanger main bodies (41, 42) are rotated in the source liquid. As a result, in the manufacturing apparatus, the heat exchanger main bodies (41, 42) are simultaneously subjected to the dipping step.

On the other hand, in the second state of the manufacturing apparatus, when the support member (30) is rotated together with the shaft member (21), the heat exchanger main bodies (41, 42) are rotated in the air. As a result, in the manufacturing apparatus, the heat exchanger main bodies (41, 42) are simultaneously subjected to the scattering step.

ADVANTAGEOUS EFFECTS OF THE INVENTION

In the first aspect of the present invention, the scattering step of rotating the heat exchanger main body (40) in the air follows the dipping step of dipping the heat exchanger main body (40) into the source liquid. When the heat exchanger main body (40) is rotated in the air, excess source liquid remaining in the void between each adjacent pair of the fins (57) or other area is scattered away therefrom by centrifugal force. Consequently, clogging of the void between each adjacent pair of the fins (57) with the adsorbent and binder is eliminated whereby the source liquid is uniformly adhered to the entire surface area of each of the fins (57).

In the way as described above, after the source liquid is adhered to the entire surface area of the heat exchanger main body (40), the adhered source liquid is dried and becomes solidified in the drying step, thereby making it possible to form a uniform adsorption layer throughout the entire surface area of the heat exchanger main body (40). Accordingly, the vent resistance of the adsorption heat exchanger is reduced and, in addition, the performance of moisture adsorption/desorption by the adsorption heat exchanger can be enhanced.

In addition, since clogging of the void between each adjacent pair of the fins (57) with the adsorbent can be eliminated in the scattering step, this makes it possible to design to either narrow the pitch of each of the fins (57) or increase the film thickness of the adsorption layer. Accordingly, either the adsorption heat exchanger can be downsized, or the performance of adsorption/desorption of the adsorption heat exchanger is further enhanced.

Besides, in the present invention, the adhered source liquid to the surface of the fins (57) is scattered away therefrom by making use of centrifugal force. When the source liquid is scatted in such a way, irregular concave-convex patterns are formed on the surface of the adsorption layer. Also note that such a concave-convex pattern is similar to a so-called "stipple pattern", "ripple pattern" or "citrus yuzu skin pattern" used in the industry of paints/paint application wherein delicate concave-convex portions form irregular patterns in the form of waves or fibers.

By virtue of forming such irregular concave-convex patterns on the surface of the adsorption layer, it becomes possible to increase the specific surface area of the adsorption layer. Accordingly, the performance of moisture absorption/desorption by the adsorption heat exchanger can be enhanced to a further extent.

In accordance with the second aspect of the present invention, in the dipping step, the heat exchanger main body (40) is rotated in the source liquid. As a result, the source liquid is distributed throughout the entire area of the void between each adjacent pair of the fins (57), thereby making it possible to adhere the source liquid to the entire surface area of each of the fins (57). Accordingly, it is possible to form an adsorption layer throughout the entire surface area of each of the fins (57), thereby making it possible to further improve the performance of adsorption/desorption of the adsorption heat exchanger obtained in accordance with the present manufacturing method.

In accordance with the third aspect of the present invention, the heat exchanger main body (40) is rotated with one of the long sides of each of the fins (57) so oriented as to face towards the rotary shaft whereby in the scattering step the source liquid remaining in the void between each adjacent pair of the fins (57) can be easily scattered away therefrom. Consequently, clogging of the void between each adjacent pair of the fins (57) with the adsorbent can be effectively eliminated.

In accordance with the fourth aspect of the present invention, prior to again conducting the dipping step after the adsorption layer was formed on the surface of the heat exchanger main body (40) in the drying step, the wetting step of dipping the heat exchanger main body (40) into water is conducted. Consequently, in the second and later dipping steps, it becomes possible to prevent the degree of viscosity of the adhered source liquid to the surface of the adsorption layer of the heat exchanger main body (40) from increasing, and in the subsequent scattering step it becomes possible to facilitate scattering of excess source liquid remaining in the void between each adjacent pair of the fins (57). Accordingly, even at the time when the surface of the adsorption layer is again overcoated with the source liquid, it is possible to eliminate clogging of the void between each adjacent pair of the fins (57) with the adsorbent and binder, thereby making it possible for the source liquid to be uniformly adhered to the entire surface area of each of the fins (57).

In accordance with the fifth aspect of the present invention, an organic water-based emulsion is used as a binder for the source liquid to form an adsorption layer whereby the adsorption layer is improved in flexibility as compared to using, for example, an inorganic binder. As a result, even if there occurs an abrupt change in temperature or an impact, the peeling-off of the absorption layer from the heat exchanger main body (40) becomes impeded, thereby making it possible to sufficiently ensure the property of adhesion of the adsorption layer to the heat exchanger main body (40). Especially, the percentage by weight of the binder (solid content) to the adsorbent is set to be not less than 10 percent nor more than 20 percent whereby it becomes possible to sufficiency ensure the property of adhesion against a wider range of variation in temperature.

In accordance with the sixth aspect of the present invention, the degree of viscosity of the source liquid (which is measured by means of a B-type rotational viscometer) is so adjusted as to fall in the range from not less than 150 mPa·s to not more than 300 mPa·s, thereby making it possible to distribute the source liquid throughout the entire area of the void between each adjacent pair of the fins (57) in the heat exchanger main body (40) which is being rotated in the source liquid in the dipping step. In addition, in the heat exchanger main body (40) which is being rotated in the air in the scattering step, the source liquid on the surface of each of the fins (57) is easily scattered away therefrom. As a result, the source liquid is further uniformly adhered to the entire surface area of the heat exchanger main body (40).

In accordance with the seventh aspect of the present invention, fine concave-convex patterns are formed on the adsorption layer on the surface of the heat exchanger main body (40), thereby making it possible to increase the specific surface area of the adsorption layer. Consequently, the performance of moisture adsorption/desorption by the adsorption heat exchanger is enhanced.

In accordance with the eighth aspect of the present invention, the average thickness of the adsorption layer on the surface of the heat exchanger main body (40) is set to be not less than 0.2 mm nor more than 0.3 mm, thereby making it possible for the adsorption layer to support thereon a required amount of adsorbent while preventing the vent resistance of the adsorption heat exchanger from increasing.

In accordance with the ninth aspect of the present invention, the pitch of each fin (57) is so set as to fall in the range from not less than 1.4 mm to not more than 1.6 mm, thereby making it possible to support a relatively large amount of adsorbent on the surface of the adsorption heat exchanger while preventing the vent resistance of the adsorption heat exchanger from increasing. Consequently, the performance of moisture adsorption/desorption of the adsorption heat exchanger is sufficiently ensured.

In accordance with the tenth aspect of the present invention, it is possible to provide an apparatus for manufacturing an adsorption heat exchanger capable of conducting the scattering step of the first aspect and the dipping step of the second aspect. In addition, in accordance with the eleventh aspect of the present invention, it is possible to conduct the scattering step and the dipping step while the heat exchanger main body (40) is firmly held by the support member (30).

Furthermore, in accordance with the twelfth aspect of the present invention, it is possible to simultaneously subject the two heat exchanger main bodies (41, 42) to the scattering step or the dipping step whereby the productivity of the absorption heat exchanger is improved. In addition, the two heat exchanger main bodies (41, 42) are rotated in such a position that they are axisymmetric with respect to the axial center of the shaft member (21) whereby the centrifugal force of the heat exchanger main body (41) and that of the heat exchanger main body (42) are offset each other. Consequently, it becomes possible to stably rotate each of the heat exchanger main bodies (41, 42) while reducing the power of rotation of the shaft member (21).

BRIEF DESCRIPTION OF THE DRAWINGS

In the drawings:

FIG. 1 is a plumbing diagram illustrating the configuration of a refrigerant circuit of an embodiment according to the present invention wherein FIG. 1(A) depicts a first mode of operation and FIG. 2(A) depicts a second mode of operation;

FIG. 3 is a schematic configuration diagram of an apparatus for manufacturing an adsorption heat exchanger of the embodiment wherein

FIG. 8 is a photographic diagram of the surface of a fin on which surface is formed an adsorption layer wherein

REFERENCE NUMERALS IN THE DRAWINGS

Figure 1:
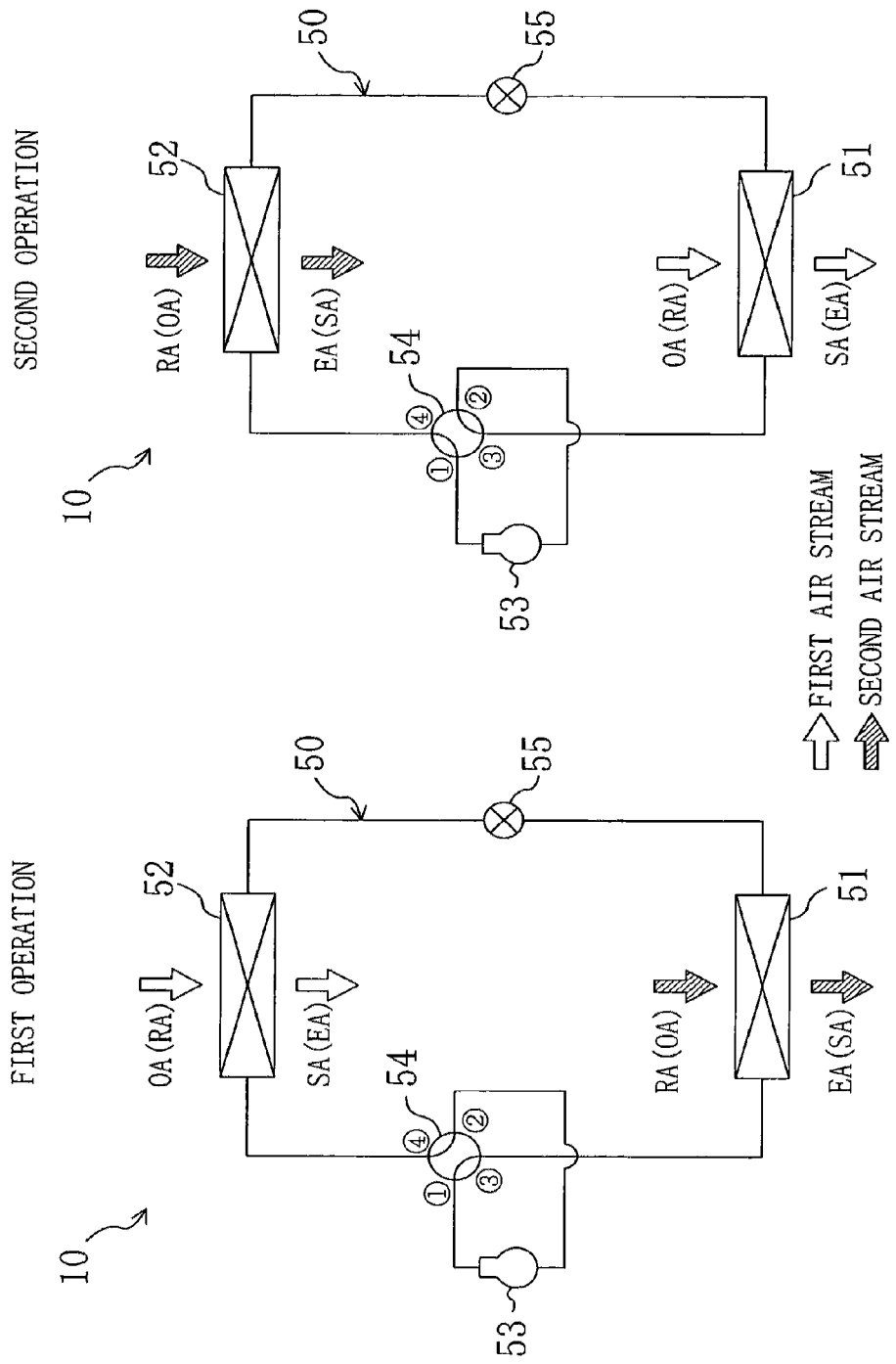

15: rotation mechanism
20: manufacturing apparatus
21: shaft member (rotary shaft)
30: support member
40: heat exchanger main body
51, 52: adsorption heat exchanger
57: fin
58: heat transfer tube

BEST EMBODIMENT MODE FOR CARRYING OUT THE INVENTION

Hereinafter, preferred embodiments of the present invention will be described in detail with reference to the accompanying drawings.

The present embodiment provides adsorption heat exchangers (51, 52) which are incorporated into a humidity control system (10) for providing indoor humidity control. The humidity control system (10) is configured such that it is capable of operating selectively in two different modes, namely a dehumidification mode of supplying dehumidified air to the room and a humidification mode of supplying humidified air to the room.

Configuration of the Humidity Control System

The humidity control system (10) is provided with a refrigerant circuit (50). Referring to FIG. 1, the refrigerant circuit (50) is a closed circuit in which a first adsorption heat exchanger (51), a second adsorption heat exchanger (52), a compressor (53), a four-way valve (54), and an electric expansion valve (55) are disposed. In the refrigerant circuit (50), the charged refrigerant is circulated therethrough and the vapor compression refrigeration cycle is performed.

In the refrigerant circuit (50), the discharge side of the compressor (53) is connected to a first port of the four-way valve (54) while the suction side is connected to a second port of the four-way valve (54). One end of the first adsorption heat exchanger (51) is connected to a third port of the four-way valve (54). The other end of the first adsorption heat exchanger (51) is connected through the electric expansion valve (55) to one end of the second adsorption heat exchanger (52). The other end of the second adsorption heat exchanger (52) is connected to a fourth port of the four-way valve (54).

The four-way valve (54) is switchable between a first state (FIG. 1(A)) in which the first and the third ports are in fluid communication and the second and the fourth ports are in fluid communication, and a second state (FIG. 1(B)) in which the first and the fourth ports are in fluid communication and the second and the third ports are in fluid communication.

Configuration of the Adsorption Heat Exchanger

Figure 2:
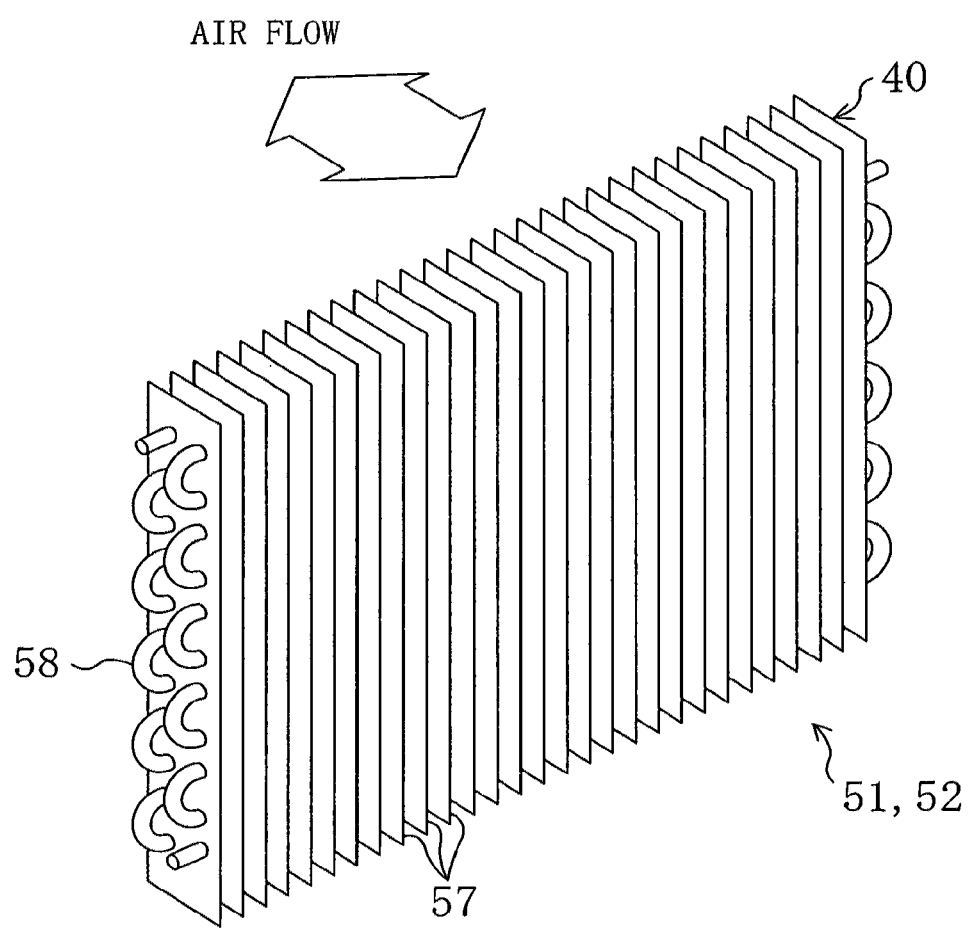
FIG. 2 is a schematic perspective view of an adsorption heat exchanger.

As shown in FIG. 2, the first and the second adsorption heat exchangers (51, 52) are each formed by applying an adsorbent-containing adsorption layer on the surface of a heat exchanger main body (40). The heat exchanger main body (40) is implemented by a fin and tube heat exchanger of the cross fin type. The heat exchanger main bodies (40) each include a plurality of fins (57) of aluminum and a heat transfer tube (58) of copper extending through each of the fins (57). The fins (57) are formed in an elongated, rectangular plate shape. The fins (57) are set in array in the extension direction of the heat transfer tube (58), the fins (57) being in parallel with each other at given intervals.

It is preferred that the pitch of each fin (57) falls within the range from not less than 1.2 mm to not more than 2.2 mm, more preferably from not less than 1.4 mm to not more than 1.6 mm. In addition, it is preferred that the diameter of the heat transfer tube (58) falls within the range from not less than 7.0 mm to not more than 9.5 mm. In addition, it is preferred that the number of rows in the width direction of the fins (57) with respect to the heat transfer tube (58) falls within the range from two (2) up to four (4). In addition, it is preferred that the number of rows in the longitudinal direction of the fins (57) with respect to the heat transfer tube (58) is from ten (10) up to twenty (20). Furthermore, the fins (57) are each formed by a so-called plate fin of rectangular plate shape. Alternatively, the fins (57) may each be formed by a so-called waffle fin of gentle wave shape in cross section relative to the width direction thereof.

Configuration of Apparatus for Manufacturing the Adsorption Heat Exchanger

Next, a manufacturing apparatus (20) used to manufacture the adsorption heat exchangers (51, 52) is described. As shown in FIG. 3, the manufacturing apparatus (20) includes a rotation mechanism (15) and a storage tank (35).

Figure 3B:
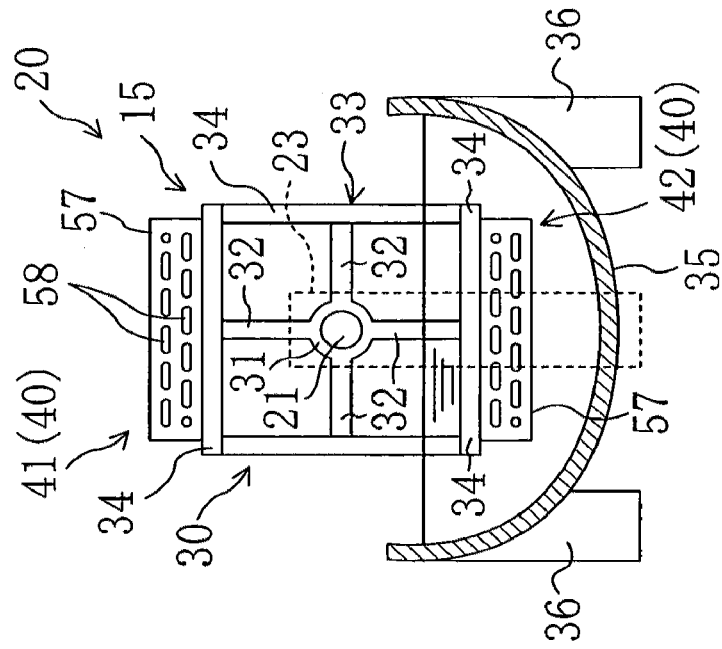
FIG. 3(A) is a transverse cross-sectional view and FIG. 3(B) is a longitudinal cross-sectional view.
Figure 3A:
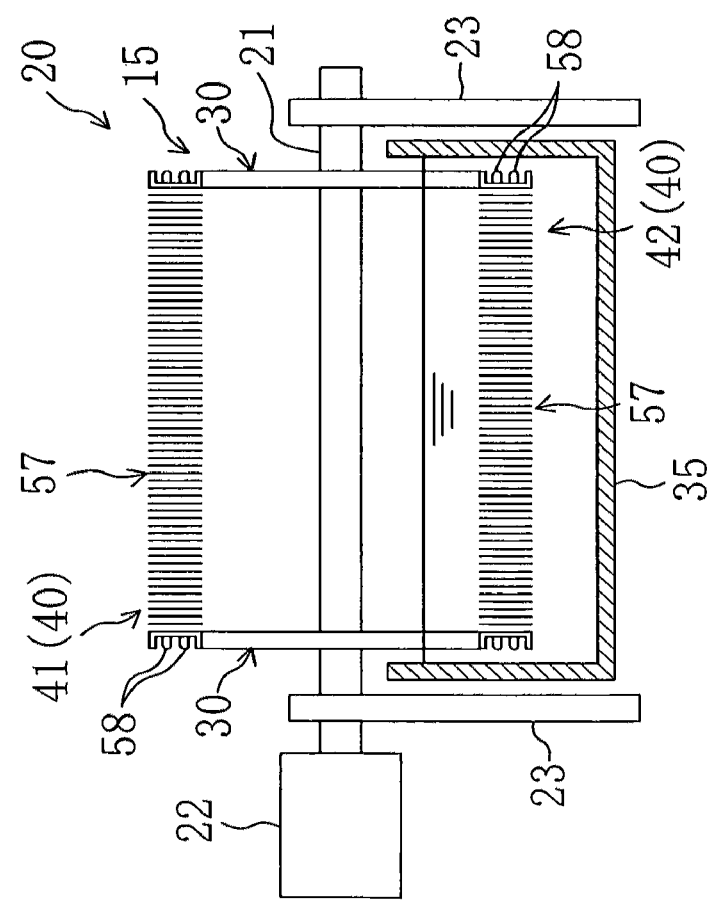

As shown in FIG. 3(A), the rotation mechanism (15) includes a shaft member (21) serving as a rotary shaft, a drive motor (22), and a support member (30). The shaft member (21) is formed extending in the horizontal direction. The shaft member (21) is supported, at its end portions, by bearing support parts (23, 23). Coupled to one end of the shaft member (21) is the drive motor (22). The shaft member (21) is rotated around the supporting point of the pair of bearing support parts (23, 23).

The pair of support members (30) are coupled, between the pair of bearing support parts (23, 23), to the outer circumference of the shaft member (21). As shown in FIG. 3(B), each support member (30) is made up of an annular part (31) of disc-like shape, four rib parts (32) extending radially outwardly from the annular part (31), and a frame part (33) coupled to the outer end part of each of the rib parts (32).

The annular part (31) receives therethrough the shaft member (21), and is united to the outer circumferential surface of the shaft member (21). The rib parts (32) are each formed integrally with the annular part (31). The rib parts (32) are arranged on the outer circumference of the annular part (31) at angular intervals of approximately 90 degrees. The rib parts (32) are each formed in a plate shape extending radially outwardly. The frame part (33) is formed by coupling together the ends of four plate members (34, 34, 34, 34). The outer and the inner edges of the frame part (33) are each formed in a respective approximate square shape. And, in the inner edge part of the frame part (33), the outer end of each rib part (32) is coupled to the lengthwise middle portion of its associated plate member (34).

The pair of support members (30, 30) support two heat exchanger main bodies (41, 42) at the same time. More specifically, the heat exchanger main bodies (41, 42) are each arranged astride the pair of support members (30, 30), and fastened so that one long side portion of each fin (57, 57, . . . ) on the both ends thereof is located along the plate members (34, 34) of each support member (30, 30). As a result, the heat exchanger main bodies (41, 42) are each supported by the pair of support members (30, 30) in such a position that one of the long sides of each of the fins (57) faces towards the shaft member (21) and the direction in which the plural fins (57) are arrayed and the axial direction of the shaft member (21) are in parallel with each other. If in this state the shaft member (21) is rotated, the support members (30, 30) are rotated around the shaft member (21) while supporting the heat exchanger main bodies (41, 42). As a result, each of the heat exchanger main bodies (41, 41) does not rotate but orbits about the axial center of the shaft member (21).

In addition, in the support member (30), each fin (57) of each heat exchanger main body (41, 42) is fastened to a pair of plate members (34, 34) facing each other in the frame part (33). In other words, the heat exchanger main bodies (41, 42) are so supported by the support members (30, 30) so that they are axisymmetric with respect to the axial center of the shaft member (21). As a result, even if the heat exchanger main bodies (41, 42) are turned concurrently with rotation of the shaft member (21), the centrifugal force of the heat exchanger main body (41) and the centrifugal force of the heat exchanger main body (42), both of which are applied to the shaft member (21), are offset each other.

The storage tank (35) is to store a source liquid in the form of slurry prepared by dispersion of an adsorbent in the form of powder in a binder in the form of liquid. The storage tank (35) is formed approximately in a semicylinder shape which is opened on the upper side. The storage tank (35) is supported by a pair of leg parts (36, 36) and disposed below the shaft member (21). The storage tank (35) is configured displaceably between a first state of approaching the shaft member (21) (FIG. 4) and a second state of being spaced away from the shaft member (21) (FIG. 5). When the storage tank (35) enters the first state and the shaft member (21) is rotated, the heat exchanger main body (40) is rotated in the source liquid while passing therethrough. On the other hand, when the storage tank (35) enters the second state and the shaft member (21) is rotated, the heat exchanger main bodies (41, 42) are pulled out from the source liquid and rotated in the air.

Method of Manufacturing the Adsorption Heat Exchanger

Next, a method of manufacturing the adsorption heat exchangers (51, 52) by the manufacturing apparatus (20) is described.

In the first place, as shown in FIG. 3, the two heat exchanger main bodies (41, 42) are fastened to the support members (30, 30) of the manufacturing apparatus (20) so that they face each other.

In the second place, the source liquid is poured into the storage tank (35) in the first state. The source liquid is stored in the storage tank (35) such that the distance from the shaft member (21) to the liquid level of the source liquid is shorter than the distance from the shaft member (21) to the heat exchanger main bodies (41, 42). The source liquid is adjusted such that the percentage by weight of the solid content of the binder to the adsorbent is not less than 10 percent nor more than 20 percent. In addition, the source liquid is moisture-adjusted such that the degree of viscosity thereof (measured by means of a B-type rotational viscometer under such conditions that the liquid temperature is 25 degrees Centigrade and the rotational speed is 60 $min^{-1}$) is not less than 150 mPa·s nor more than 300 mPa·s. And, there is no preference as to the kind of adsorbent to be contained in the source liquid so long as superior adsorption of moisture is ensured. For example, zeolite, silica gel, activated carbon, material of the organic polymer family having a hydrophilic or hydrophobic functional group, material of the ion-exchange resin family having a carboxyl or sulfonate group, functional polymeric material (e.g., temperature-sensitive polymer et cetera), sepiolite, imogolite, or material of the clay mineral family (e.g., allophone, kaolinite et cetera) may be used as an adsorbent to be contained to prepare the source liquid. However, in view of the property of dispersion, the degree of viscosity and so on, zeolite, silica gel, or mixture thereof is preferable. In addition, as a binder to be contained to prepare the source liquid, resin of the urethane family, resin of the acrylic family, or organic water-based emulsion (e.g., ethylene-vinyl acetate copolymer et cetera) is preferable.

In the subsequent dipping step, when the storage tank (35) is in the first state, the drive motor (22) is energized whereby the shaft member (21) and the support members (30, 30) are rotated. As a result, each of the heat exchanger main bodies (41, 42) orbits the shaft member (21) wherein the direction in which the fins (57) are arrayed is an axial direction. Also note that the heat exchanger main bodies (41, 42) are rotated at a relatively slow speed.

Figure 4:
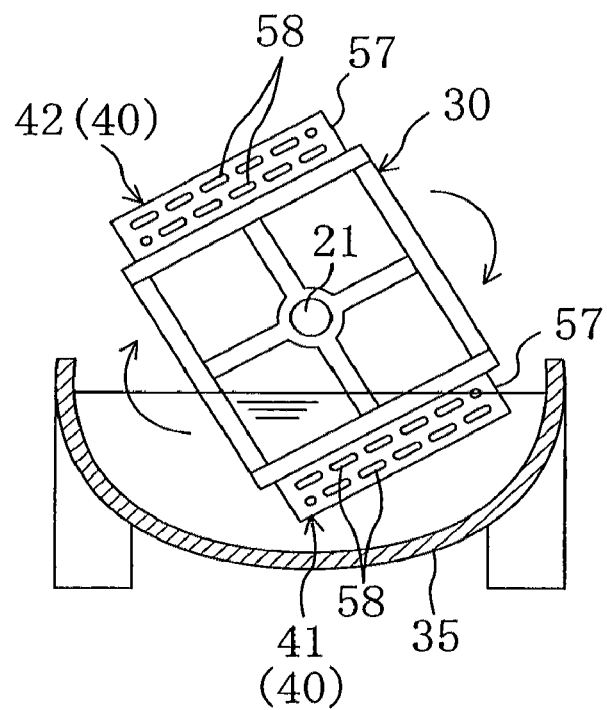
FIG. 4 is a schematic configuration diagram which provides the description of a dipping step at the time of manufacture of the adsorption heat exchanger.
Figure 5:
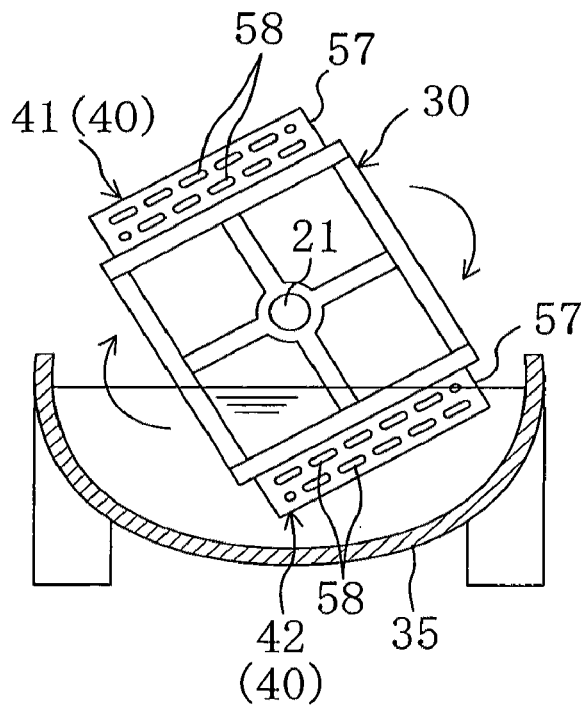
FIG. 5 is a schematic configuration diagram which provides the description of a scattering step at the time of manufacture of the adsorption heat exchanger.

In the dipping step, as shown in FIG. 4, one heat exchanger main body, i.e., the heat exchanger main body (41) which is a first heat exchanger, is dipped into the source liquid held in the storage tank (35) while being rotated. The first heat exchanger (41) is rotated in the direction that allows passage of the source liquid through the void between each adjacent pair of the fins (57). Consequently, it is ensured that the source liquid is distributed throughout the entire area of the void between each adjacent pair of the fins (57) of the first heat exchanger (41) whereby the source liquid is adhered, in the form of a film, to the entire surface area of each of the fins (57).

In the dipping step, the shaft member (21) and the support members (30, 30) are rotated to a further extent, the other heat exchanger main body, i.e., the heat exchanger main body (42) which is a second heat exchanger, is dipped into the source liquid held in the storage tank (35) while being rotated. The second heat exchanger (42) is rotated in the direction that allows passage of the source liquid through the void between each adjacent pair of the fins (57). Consequently, it is ensured that the source liquid is distributed throughout the entire area of the void between each adjacent pair of the fins (57) of the second heat exchanger (42) whereby the source liquid is adhered, in the form of a film, to the entire surface area of each of the fins (57).

In the subsequent scattering step, as shown in FIG. 5, the storage tank (35) enters the second state and the shaft member (21) and the support members (30, 30) are rotated. As a result, the heat exchanger main bodies (41, 42) are tuned in the air. Also note that in the scattering step the shaft member (21) is rotated at a higher speed (for example, 500 rpm) than in the dipping step.

When each of the heat exchanger main bodies (41, 42) is rotated in the air, excess source liquid remaining in the void between each adjacent pair of the fins (57) of the heat exchanger main bodies (41, 42) is scattered away therefrom by centrifugal force. As a result, in each of the heat exchangers (41, 42), excess source liquid in the void between each adjacent pair of the fins (57) is removed whereby the adhered source liquid to the entire surface area of each of the fins (57) is uniformized.

Figure 6:
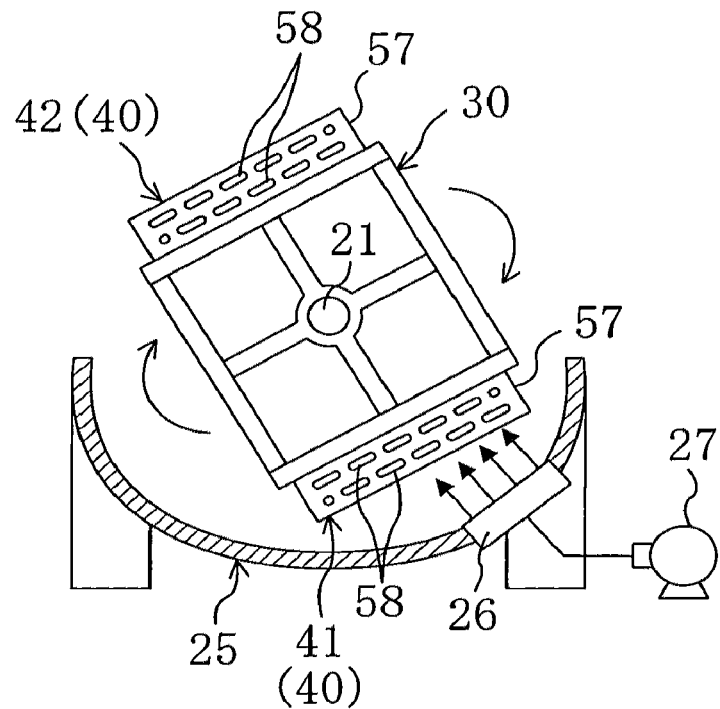
FIG. 6 is a schematic configuration diagram which provides the description of a drying step at the time of manufacture of the adsorption heat exchanger.

The drying step for the heat exchanger main bodies (41, 42) follows the scattering step. As shown in FIG. 6, in the drying step, an air supply tank (25) is disposed below the shaft member (21) in place of the storage tank (35). Like the storage tank (35), the air supply tank (25) is formed approximately in a semicylinder shape which is opened on the upper side, and has in its bottom plate an air outlet opening (26). Hot air conveyed by an air blower (27) is blown off from the air outlet opening (26). During the drying step, with rotation of the shaft member (21), each of the heat exchangers (41, 42) is sequentially passed through the vicinity of the air outlet opening (26). As a result, in the surface of each of the heat exchangers (41, 42), the source liquid in the form of a film is dried and becomes solidified whereby an adsorbent-containing adsorption layer is gradually formed.

Figure 7:
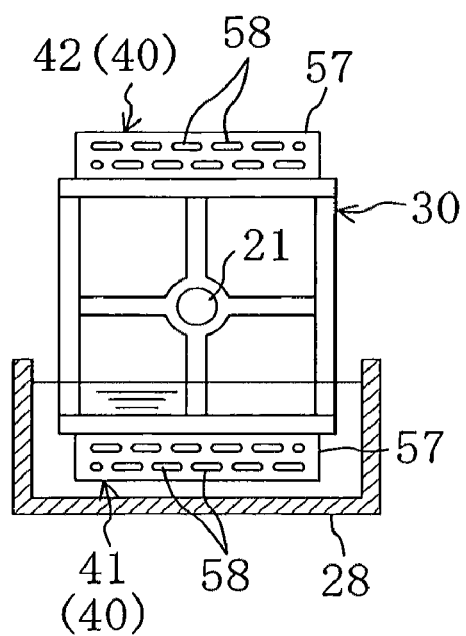
FIG. 7 is a schematic configuration diagram which provides the description of a wetting step at the time of manufacture of the adsorption heat exchanger.

The wetting step for each of the heat exchanger main bodies (41, 42) follows the drying step. In the wetting step, as shown in FIG. 7, each of the heat exchanger main bodies (41, 42) is dipped into water held in a water tank (28). As a result, the adsorption layer of each of the heat exchangers (41, 42) is placed in the aqueous state.

After completion of the wetting step, the dipping step is again conducted. In the dipping step, the adsorption layer on the surface of each of the heat exchanger main bodies (41, 42) which are dipped into the source liquid is in the aqueous state. Here, if the adsorption layer of each of the heat exchanger main bodies (41, 42) which are dipped into the source liquid is in the dry state, this facilitates absorption of moisture (which is present in the adhered source liquid to the adsorption layer) into the adsorption layer. Consequently, the degree of viscosity of the adhered source liquid to the surface of the adsorption layer will increase. This impedes scattering of the source liquid remaining in the void between each adjacent pair of the fins (57) in the following scattering step. On the other hand, in the present embodiment, in the second and later dipping steps, the adsorption layer is already in the aqueous state thereby impeding absorption of moisture present in the source liquid into the surface of the adsorption layer. As a result, even in the subsequent scattering step, the source liquid in the void between each adjacent pairs of the fins (57) is easily scattered away therefrom.

As the steps (shown in FIGS. 4 through 7) are repeatedly conducted as described above, the thickness of the adsorption layer on the surface of each of the heat exchanger main bodies (41, 42) gradually grows. Each of the steps is repeatedly carried out (for example, about 12 cycles or so) until the average thickness of the adsorption layer of each of the fins (57) of the heat exchanger main bodies (41, 42) falls within the range from not less than 0.2 mm to not more than 0.3 mm.

Shape of the Adsorption Layer on the Fin Surface

Figure 8A:
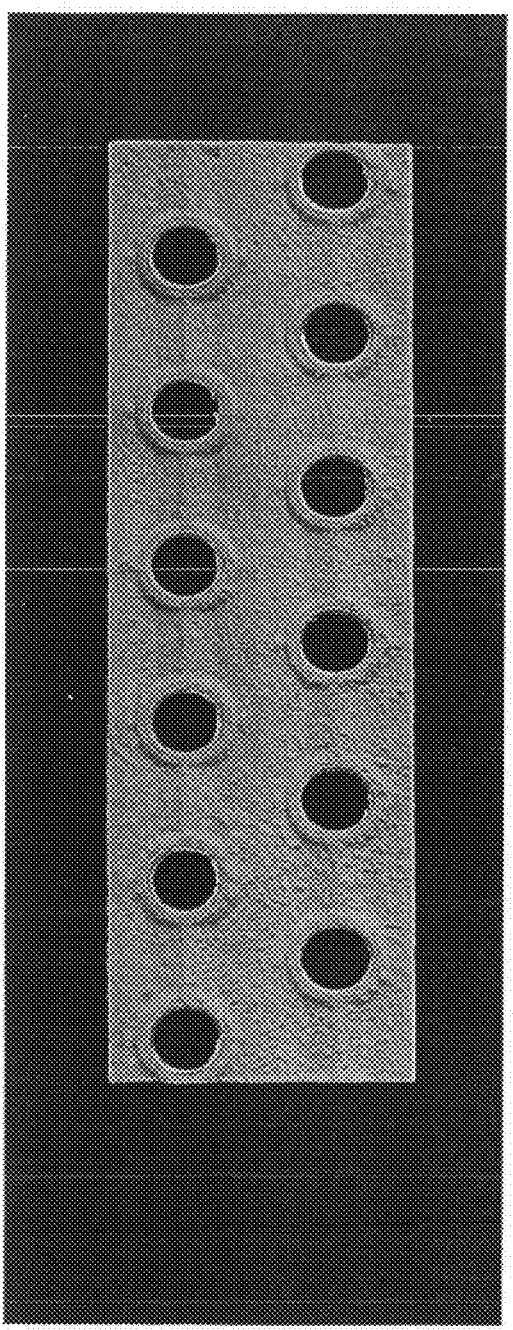
FIG. 8(A) shows a fin according to the embodiment and FIG. 8(B) shows a fin for comparison with the fin of FIG. 8(A).
Figure 8B:
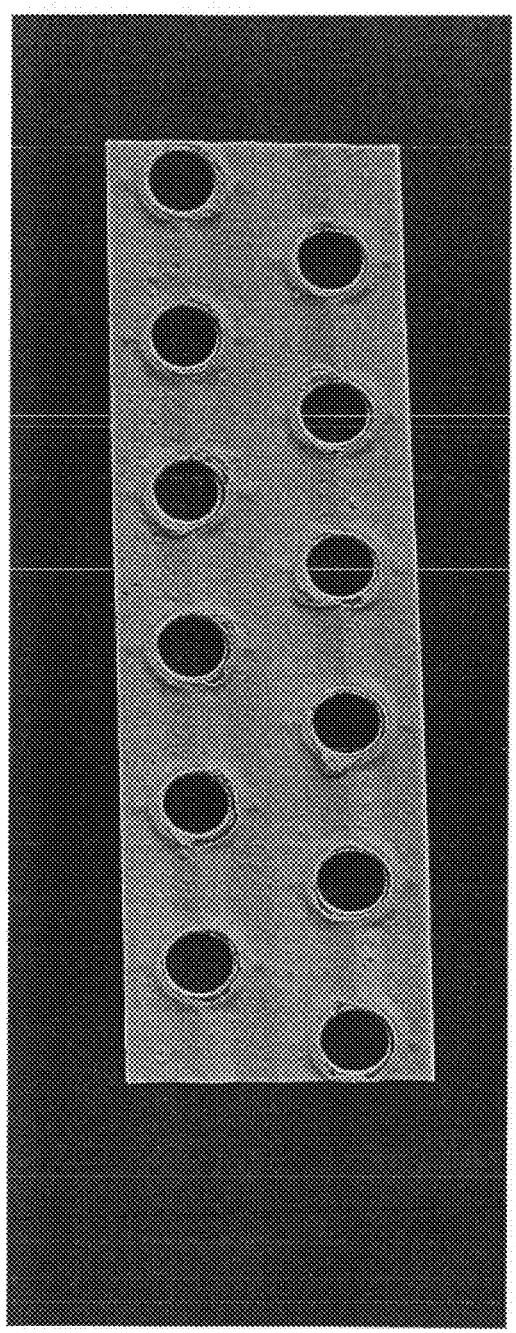

Referring to FIG. 8(A), there is shown a copy of a photograph of the surface of a certain fin (57) of the adsorption heat exchangers (51, 52) obtained in the way as described above. On the other hand, FIG. 8(B) shows a copy of a photograph of the surface of a fin for comparison with FIG. 8(A). The fin of FIG. 8(B) is obtained as follows: a heat exchanger main body is dipped, in the non-moving state, into the source liquid; the adhered source liquid to the fin surface is blown away by air; and an adsorption layer is formed by drying and solidification. Fine concave-convex patterns that are even visually conformable are formed on the adsorption layer of the fin (57) formed in accordance with the present embodiment. It is estimated that these concave-convex patterns were formed due to the fact that the adhered source liquid to the surface of the fin (57) was scattered away therefrom by making utilization of centrifugal force. In addition, such an observed concave-convex pattern is similar to a so-called "stipple pattern", "ripple pattern" or "citrus yuzu skin pattern" used in the industry of paints/paint application.

Running Operation

Next, how the humidity control system (10) provided with the adsorption heat exchangers (51, 52) obtained in the way as described above operates is now described. The humidity control system (10) of the present embodiment operates selectively in a dehumidification mode and in a humidification mode. During both the dehumidification and the humidification modes of the humidity control system (10), outdoor air (OA) taken in is humidity-controlled and supplied as supply air (SA) to the room while simultaneously room air (RA) taken in is discharged as exhaust air (EA) to outside the room. That is to say, during both the dehumidification and the humidification modes of the humidity control system (10), room ventilation is provided. In addition, during any of the dehumidification and the humidification modes of the humidity control system (10), the first and the second operations are alternately repeatedly carried out at given intervals (for example, at intervals of three minutes).

During the dehumidification mode, the humidity control system (10) takes in outdoor air (OA) as a first air stream while taking in room air (RA) as a second air stream. On the other hand, during the humidification mode, the humidity control system (10) takes in room air (RA) as a first air stream while taking in outdoor air (OA) as a second air stream.

In the first place, the first operation is described. During the first operation, a second air stream is fed to the first adsorption heat exchanger (51) and a first air stream is fed to the second adsorption heat exchanger (52). In the first operation, a regeneration operation for the first adsorption heat exchanger (51) and an adsorption operation for the second adsorption heat exchanger (52) are performed.

As shown in FIG. 1(A), in the refrigerant circuit (50) in the first operation, the four-way valve (54) is placed in the first state. Upon operation of the compressor (53), the refrigerant is circulated within the refrigerant circuit (50). More specifically, refrigerant discharged from the compressor (53) gives up heat in the first adsorption heat exchanger (51), and is condensed. The refrigerant condensed in the first adsorption heat exchanger (51) is decompressed during passage through the electric expansion valve (55). Thereafter, the refrigerant absorbs heat in the second adsorption heat exchanger (52), and is evaporated. The refrigerant evaporated in the second adsorption heat exchanger (52) is drawn into and compressed in the compressor (53). Then, the refrigerant is again discharged from the compressor (53).

As described above, in the refrigerant circuit (50) in the first operation, the first adsorption heat exchanger (51) functions as a condenser while the second adsorption heat exchanger (52) functions as an evaporator. In the first adsorption heat exchanger (51), the adsorbent of the surface of the fin (57) is heated by refrigerant in the heat transfer tube (58) and moisture desorbed from the heated adsorbent is given to the second air stream. On the other hand, in the second adsorption heat exchanger (52), moisture present in the first air stream is adsorbed on the adsorbent of the surface of the fin (57) and the resulting heat of adsorption is absorbed by refrigerant in the heat transfer tube (58).

And, if the humidity control system (10) is operating in the dehumidification mode, then the first air stream dehumidified in the second adsorption heat exchanger (52) is supplied to the room and the moisture desorbed from the first adsorption heat exchanger (51) is discharged, together with the second air stream, to outside the room. On the other hand, if the humidity control system (10) is operating in the humidification mode, then the second air stream humidified in the first adsorption heat exchanger (51) is supplied to the room and the first air stream whose moisture is removed to the second adsorption heat exchanger (52) is discharged to outside the room.

In the second place, the second operation is described. During the second operation, a first air stream is fed to the first adsorption heat exchanger (51) and a second air stream is fed to the second adsorption heat exchanger (52). In the second operation, a regeneration operation for the second adsorption heat exchanger (52) and an adsorption operation for the first adsorption heat exchanger (51) are performed.

As shown in FIG. 1(B), in the refrigerant circuit (50) in the second operation, the four-way valve (54) is placed in the second state. Upon operation of the compressor (53), the refrigerant is circulated within the refrigerant circuit (50). More specifically, refrigerant discharged from the compressor (53) gives up heat in the second adsorption heat exchanger (52), and is condensed. The refrigerant condensed in the second adsorption heat exchanger (52) is decompressed during passage through the electric expansion valve (55). Thereafter, the refrigerant absorbs heat in the first adsorption heat exchanger (51), and is evaporated. The refrigerant evaporated in the first adsorption heat exchanger (51) is drawn into and compressed in the compressor (53). Then, the refrigerant is again discharged from the compressor (53).

As described above, in the refrigerant circuit (50), the second adsorption heat exchanger (52) functions as a condenser while the first adsorption heat exchanger (51) functions as an evaporator. In the second adsorption heat exchanger (52), the adsorbent of the surface of the fin (57) is heated by refrigerant in the heat transfer tube (58) and moisture desorbed from the heated adsorbent is given to the second air stream. On the other hand, in the first adsorption heat exchanger (52), moisture present in the first air stream is adsorbed on the adsorbent of the surface of the fin (57) and the resulting heat of adsorption is absorbed by refrigerant in the heat transfer tube (58).

And, if the humidity control system (10) is operating in the dehumidification mode, then the first air stream dehumidified in the first adsorption heat exchanger (51) is supplied to the room and the moisture desorbed from the second adsorption heat exchanger (52) is discharged, together with the second air stream, to outside the room. On the other hand, if the humidity control system (10) is operating in the humidification mode, then the second air stream humidified in the second adsorption heat exchanger (52) is supplied to the room and the first air stream whose moisture is removed to the first adsorption heat exchanger (51) is discharged to outside the room.

ADVANTAGEOUS EFFECTS OF THE EMBODIMENT

In the method of manufacturing the adsorption heat exchangers (51, 52) according to the embodiment, the dipping step of dipping the heat exchanger main body (40) into the source liquid is conducted, which step is followed by the scattering step of rotating the heat exchanger main body (40) in the air. When the heat exchanger main body (40) is rotated in the air, excess source liquid remaining in the void between each adjacent pair of the fins (57) is scattered away therefrom by centrifugal force. Consequently, clogging of the void between each adjacent pair of the fins (57) with the adsorbent and binder is eliminated whereby the source liquid is uniformly adhered to the entire surface area of each of the fins (57).

In the way as described above, after the source liquid is adhered to the entire surface area of the heat exchanger main body (40), the adhered source liquid is dried and becomes solidified in the drying step, thereby making it possible to form a uniform adsorption layer throughout the entire surface area of the heat exchanger main body (40). Accordingly, the vent resistance of the adsorption heat exchanger is reduced and, in addition, the performance of moisture adsorption/desorption by the adsorption heat exchanger can be enhanced.

In addition, since clogging of the void between each adjacent pair of the fins (57) with the adsorbent can be eliminated in the scattering step, this makes it possible to design to either narrow the pitch of each of the fins (57) or increase the film thickness of the adsorption layer. Accordingly, either the adsorption heat exchanger can be downsized, or the performance of adsorption/desorption of the adsorption heat exchanger is further enhanced.

Furthermore, in the scattering step, the adhered source liquid to the surface of the fins (57) is scattered away therefrom by centrifugal force whereby irregular concave-convex patterns as photographically shown in FIG. 8(A) are formed on the absorption layer surface. As a result, in the adsorption heat exchangers (51, 52) obtained in accordance with the manufacturing method of the present embodiment, the specific surface area of the adsorption layer is larger as compared to that of the adsorption layer of FIG. 8(B) obtained by simply blowing off the source liquid by air. Accordingly, the performance of moisture adsorption/desorption by the adsorption heat exchanger is further enhanced.

It should be noted that the above-described embodiments are essentially preferable exemplifications which are not intended in any sense to limit the scope of the present invention, its application, or its application range.

INDUSTRIAL APPLICABILITY

As has been described above, the present invention is useful for adsorption heat exchangers in which an adsorption layer containing an adsorbent is formed on the surface of a heat exchanger main body, and for methods and apparatuses for manufacturing such adsorption heat exchangers.

What is claimed is:

1. A method of manufacturing an adsorption heat exchanger by dipping a heat exchanger main body, the heat exchanger main body being provided with a plurality of plate-like fins arrayed in an extension direction of a heat transfer tube, into a slurry source liquid prepared by dispersion of an adsorbent in a liquid binder, to thereby form an adsorption layer on the surface of the heat exchanger main body, the method comprising:
   a dipping step in which the heat exchanger main body is dipped into the source liquid;
   a scattering step in which the heat exchanger main body after having undergone the dipping step is rotated in the air around a rotary shaft extending along the direction in which the plurality of fins are arranged; and
   a drying step in which the heat exchanger main body after having undergone the scattering step is dried,
   wherein the plurality of fins are formed in a rectangular plate shape; and
   wherein in the scattering step the heat exchanger main body is rotated in such a position that one of the long edges of each of the plurality of fins points towards the rotary shaft.

2. The method of claim 1, wherein in the dipping step the heat exchanger main body is rotated in the source liquid around the rotary shaft at a lower speed than in the scattering step.

3. The method of either claim 2 or claim 1,
   wherein the binder is an organic water-based emulsion; and
   wherein the percentage by weight of the solid content of the binder with respect to the adsorbent in the source liquid is not less than 10 percent nor more than 20 percent.

4. The method of either claim 2 or claim 1, wherein the degree of viscosity of the source liquid is not less than 150 mPa·s nor more than 300 mPa·s when measured by means of a B-type rotational viscometer under such conditions that the liquid temperature is 25 degrees Centigrade, and the rotational speed is 60 $\min^{-1}$.

5. A method of manufacturing an adsorption heat exchanger by dipping a heat exchanger main body, the heat exchanger main body being provided with a plurality of plate-like fins arrayed in an extension direction of a heat transfer tube, into a slurry source liquid prepared by dispersion of an adsorbent in a liquid binder, to thereby form an adsorption layer on the surface of the heat exchanger main body, the method comprising:
   a dipping step in which the heat exchanger main body is dipped into the source liquid;
   a scattering step in which the heat exchanger main body after having undergone the dipping step is rotated in the air around a rotary shaft extending along the direction in which the plurality of fins are arranged; and
   a drying step in which the heat exchanger main body after having undergone the scattering step is dried,
   wherein the dipping step, the scattering step, the drying step, and a wetting step in which the heat exchanger main body after having undergone the drying step is dipped into water are sequentially repeatedly conducted.

6. The method of claim 5, wherein in the dipping step the heat exchanger main body is rotated in the source liquid around the rotary shaft at a lower speed than in the scattering step.

7. The method of either claim 5 or claim 6,
   wherein the binder is an organic water-based emulsion; and
   wherein the percentage by weight of the solid content of the binder with respect to the adsorbent in the source liquid is not less than 10 percent nor more than 20 percent.

8. The method of either claim 5 or claim 6, wherein the degree of viscosity of the source liquid is not less than 150 mPa·s nor more than 300 mPa·s when measured by means of a B-type rotational viscometer under such conditions that the liquid temperature is 25 degrees Centigrade, and the rotational speed is 60 $\min^{-1}$.

9. The method of either claim 1 or claim 8, wherein in the dipping step, the heat exchanger main body is dipped in the source liquid while rotating the heat exchanger main body around a horizontally-extending rotary shaft in such a manner that a length of the heat exchanger main body along a rotating axis of the rotary shaft is in parallel with the extension direction in which the plurality of fins are arranged.

* * * * *